(12) United States Patent  (10) Patent No.: US 9,411,692 B2
Graefe et al.  (45) Date of Patent: Aug. 9, 2016

(54) APPLYING WRITE ELISION

(71) Applicant: HEWLETT-PACKARD DEVELOPMENT COMPANY, L.P., Houston, TX (US)

(72) Inventors: Goetz Graefe, Madison, WI (US); Harumi Kuno, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 476 days.

(21) Appl. No.: 13/871,187

(22) Filed: Apr. 26, 2013

(65) Prior Publication Data

US 2014/0324782 A1  Oct. 30, 2014

(51) Int. Cl.
G06F 11/14  (2006.01)

(52) U.S. Cl.
CPC ........ *G06F 11/1471* (2013.01); *G06F 11/1451* (2013.01); *G06F 2201/80* (2013.01)

(58) Field of Classification Search
CPC ............ G06F 11/1469; G06F 11/1407; G06F 11/1451; G06F 11/1456; G06F 11/1464; G06F 11/1471
USPC .......... 711/118, 133, 144, 162, E12.001, 135, 711/136, 141, 143, 159, 161, E12.023, 711/E12.024, E12.04, 103, 121, 130, 142, 711/146, 148, 154, E12.017, E12.019, 711/E12.022, E12.026, E12.028, E12.033, 711/E12.034, E12.035, E12.041, E12.103, 711/100, 104, 105, 113, 114, 122, 132, 134, 711/145, 156, 158, 160, 170, 173, 3, 6; 704/E13.008, E15.045, E15.001, 257, 704/E13.001, 260, 270, 270.1, 275; 707/639, E17.005, E17.01, E17.014, 707/E17.032, E17.044, 623, 646, 649, 654, 707/694, 695, 822, 999.003
See application file for complete search history.

(56) References Cited

U.S. PATENT DOCUMENTS

| 5,043,866 A | 8/1991 | Myre, Jr. |
| 5,561,795 A | 10/1996 | Sarkar |
| 5,623,633 A * | 4/1997 | Zeller et al. .................... 711/146 |
| 6,061,765 A * | 5/2000 | Van Doren et al. ........... 711/145 |
| 7,334,002 B2 | 2/2008 | Byrne |
| 7,921,080 B2 | 4/2011 | Taylor |
| 8,200,633 B2 | 6/2012 | Bendakovsky |
| 8,335,902 B1 | 12/2012 | Feathergill |
| 2003/0061537 A1* | 3/2003 | Cha ..................... G06F 11/1471 714/16 |
| 2007/0005664 A1* | 1/2007 | Kodavalla et al. ............ 707/202 |
| 2007/0050548 A1* | 3/2007 | Bali et al. ....................... 711/118 |
| 2012/0005558 A1 | 1/2012 | Steiner |

(Continued)

OTHER PUBLICATIONS

Kim et al. ("Adaptive Logging for mobile Device", Journal; Proceeding of the VLDB Endownment, vol. 3; Issue 1-2, Sep. 2010; pp. 1481-1492).*

(Continued)

*Primary Examiner* — Jay Morrison
*Assistant Examiner* — Ken Hoang
(74) *Attorney, Agent, or Firm* — Trop, Pruner & Hu, P.C.

(57) ABSTRACT

A data portion is evicted from a buffer, where the evicted data portion is modified from a corresponding data portion in a persistent storage. Write elision is applied to suppress writing the evicted data portion to the persistent storage. Subsequent to applying the write elision and in response to reading a version of the data portion, a redo of a modification of the read data portion is applied.

16 Claims, 4 Drawing Sheets

(56) References Cited

U.S. PATENT DOCUMENTS

2014/0040199 A1* 2/2014 Golab et al. ............... 707/634
2014/0317359 A1* 10/2014 Naik et al. ................. 711/142

OTHER PUBLICATIONS

Umar Farooq Minhas et al., RemusDB: Transparent High Availability for Database Systems, Proceedings of the VLDB Endowment, vol. 4, No. 11, 2011 (11 pages).
Goetz Graefe, et al., International Application No. PCT/US13/23726 entitled Recovering Pages of a Database filed Jan. 30, 2013 (25 pages).
Bayer et al., Organization and maintenance of large ordered indices, Acta Inf. 1: (1972) (18 pages).
David B. Lomet: High speed on-line backup when using logical log operations, 2000 (12 pages).
Douglas Comer, The ubiquitous B-tree, ACM Comput. Surv. 11(2): 121-137 (1979) (17 pages).
Goetz Graefe et al., Definition, Detection, and Recovery of Single-Page Failures, a Fourth Class of Database Failures, VLDB Aug. 2012 (10 pages).
Goetz Graefe et al., Instant Recovery with Write-Ahead Logging, 2014 (5 pages).
Goetz Graefe et al., Self-diagnosing and self-healing indexes, DBTest 2012 (8 pages).
Goetz Graefe et al., Self-selecting, self-tuning, incrementally optimized indexes, EDBT 2010 (12 pages).
Goetz Graefe et al.., Foster B-trees, ACM TODS 37(3): 17 (Aug. 2012) (30 pages).
Goetz Graefe, Modern B-tree Techniques, Foundations and Trends in Databases, vol. 3(4): 203-402 (2011) (203 pages).
Goetz Graefe, Sorting and indexing with Partitioned B-trees, CIDR 2003 (13 pages).
Goetz Graefe, The story of instant recovery—Extended Abstract, presented at BTW 2013 Conference (15th GI Symposium Database Systems for Business, Technology and the Web), in Magdeburg, Germany, Mar. 2013 (3 pages).
Goetz Graefe: A survey of B-tree locking recovery techniques (Feb. 2012) (28 pages).
Guido Moerkotte: Small materialized aggregates: a light weight index structure for data warehousing, VLDB 1998 (12 pages).
Harry Leslie et al., Efficient search of multi dimensional B-trees, VLDB 1995: 710-719 (10 pages).
Lakshmi N. Bairavasundaram et al., An analysis of data corruption in the storage stack, 2008 (16 pages).
Lakshmi N. Bairavasundaram et al., An analysis of latent sector errors in disk drives, ACM SIGMETRICS 2007 (12 pages).
Mohan et al., An efficient and flexible method for archiving a data base, RJ 9733 (84619) Mar. 15, 1994 (16 pages).
Mohan et al., ARIES: a transaction recovery method supporting fine-granularity locking and partial rollbacks using write-ahead logging, ACM TODS 17(1) (1992) (69 pages).
Severance et al., Differential files: their application to the maintenance of large databases, ACM TODS 1(3) (1976) (12 pages).

* cited by examiner

APPLYING WRITE ELISION

BACKGROUND

A database can be stored in a storage system that has one or multiple storage devices. Examples of storage devices can include disk-based storage devices, integrated circuit storage devices, and so forth.

Data loss due to failure of storage devices is a concern. To address the possibility of failure of storage devices, backups of data in the database can be carried out. Backups can include full backups, where the entirety of the database is copied to a backup storage system. Backups can also include differential or incremental backups, where only database data that has changed since the last backup is copied to the backup storage system. As the size of databases has increased, the time associated with carrying out backup operations as well as restore operations (to restore data from a data backup) can be relatively long.

BRIEF DESCRIPTION OF THE DRAWINGS

Some embodiments are described with respect to the following figures.

DETAILED DESCRIPTION

A differential backup operation backs up only data that has been changed since the last backup. Thus, in general, a differential backup involves copying a smaller amount of data than a full backup, where all data of a database is backed up to a backup storage subsystem. However, in a large database system, even a differential backup can involve the transfer of a relatively large amount of data to the backup storage subsystem, particularly when the database system executes a relatively large number of database transactions that can change data within a time interval between backups.

In accordance with some implementations, to reduce the amount of data that is involved in a differential backup operation, write elision can be applied. Write elision refers generally to suppressing the writing of a dirty data portion to persistent storage, to reduce the amount of changed data that is stored in the persistent storage. Reducing the amount of changed data in the persistent storage results in a reduced amount of data that is involved in a differential backup operation, since the differential backup operation involves a backup of data that has changed since the last backup. Reducing the amount of data also increases the speed at which a differential backup operation can complete.

Figure 1:
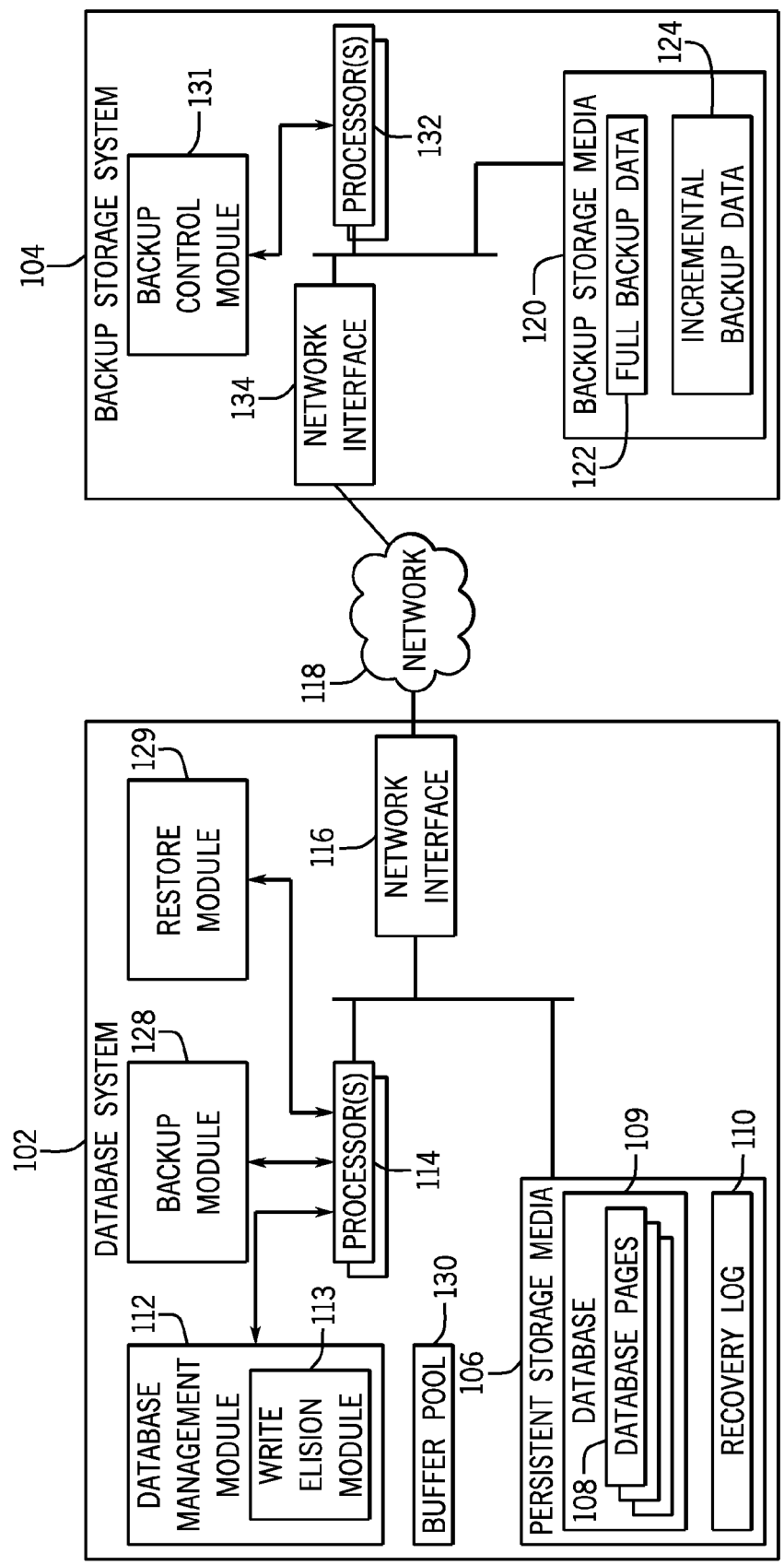
FIG. 1 is a block diagram of an example arrangement that includes a database system and a backup storage system to backup data of the database system, according to some implementations.

FIG. 1 shows a database system 102 that includes persistent storage media 106, which can be implemented with one or multiple storage devices, such as disk-based storage devices (e.g. magnetic or optical disk drives), integrated circuit storage devices (e.g. flash memory devices, battery-backed random access memory devices, phase change memory devices, etc.), and so forth. The persistent storage media 106 can store database pages 108 that are part of a database 109. The persistent storage media 106 is able to maintain its content even if power is removed from the database system 102.

A database can refer to any repository or collection of data. A "page" of a database can refer to any segment or part of the database. In some examples, a database page can be represented by a node of a hierarchical index such as a B-tree index. The B-tree index includes a hierarchical arrangement of nodes, which includes a root node, intermediate nodes, and leaf nodes at the bottom of the B-tree index. Each leaf node represents a respective page of the database. The intermediate nodes can each be associated with a range of keys; child nodes of a given intermediate node are associated with keys within the key range of the given intermediate node. A key includes at least one attribute of data records in the database. As an example, if a database contains data records relating to employees of a company, then an attribute of the data records can be an employee identifier.

The persistent storage media 106 can also store a recovery or transaction log 110, which records transactions that have made changes to data in the database. A transaction can refer to any data operation that reads and/or writes data of the database. A transaction can be issued in response to a request from a user, an application, or another entity.

The recovery log 110 can refer to any data structure, including one or multiple files or other data container(s). The recovery log 110 is persistently stored in the persistent storage media 106, such that the recovery log 110 would be available even if the database system 102 were to suffer a system crash or otherwise reset. By recording transactions in the recovery log, those transactions can be repeated by replaying the transactions from the recovery log should a failure prevent their completion for any reason. Note that the storage device(s) used to store the transaction recovery log 110 may be different from the storage device(s) used to store database content.

The database system 102 also includes a buffer pool 130. A buffer pool can refer generally to any temporary storage, implemented using one or multiple memory devices, to store data of the database 109. The memory device(s) can be implemented with random access memory device(s) or any other type of memory device(s). The buffer pool 130 can be implemented with memory storage that has a faster access speed than the persistent storage media 106.

The database system 102 also includes a database management module 112, which includes machine-readable instructions executable on one or more processors 114 of the database system 102. The database management module 112 is able to manage access (read access or write access) of the database 109. Transactions that are run by the database management module 112 can carry out read or write accesses of data in the buffer pool 130.

As database pages 108 in the persistent storage media 106 are accessed, the accessed database pages 108 can be retrieved into the buffer pool 130. Any subsequent access of such database pages 108 can thus be more quickly satisfied from the buffer pool 130 (since an access of the slower persistent storage media 106 can be avoided).

Write accesses can modify data in the buffer pool 130, where this modification is not immediately reflected in the database 109 stored in the persistent storage media 106.

The buffer pool 130 is constrained in terms of the amount of storage space available in the buffer pool 130. Generally, the buffer pool 130 may have a much smaller storage capacity than the persistent storage media 106. As a result, as transactions are executed and database pages 108 are retrieved into the buffer pool 130, the buffer pool 130 may become full, at which point database pages may have to be evicted from the buffer pool 130 to make room for new database pages retrieved from the persistent storage media 106.

In some cases, an evicted database page may be dirty (in other words, the database page is modified from the corresponding database page 108 stored in the database 109). If the evicted dirty database page is written back to the database 109, then a subsequent incremental backup of the database 109 would involve the backup of the modified database page. This can lead to an increased amount of data that is involved in the incremental backup.

In accordance with some implementations, write elision of the evicted dirty database page can be applied by a write elision module 113. The write elision module 113 can be part of the database management module 112, or alternatively, can be separate from the database management module 113. The write elision module 113 suppresses (or forgets) to write the evicted dirty database page from the buffer pool 130 to the persistent storage media 106. As a result, the database page 108 in the database 109 that corresponds to the evicted database page is out-of-date. Any subsequent read of this database page 108 would result in retrieval of the database page that is out-of-date (in other words, the retrieved database page would not reflect the modification made in the evicted dirty database page).

Although the foregoing refers to reading the out-of-date database page from the database 109 in the persistent storage media 106, it is noted that in other examples, the out-of-date database page may be read from a different storage location, such as from a backup storage system 104 or from another location.

To address the issue of a subsequent read retrieving an out-of-date database page, upon eviction of the dirty database page from the buffer pool 130, a record regarding the modification corresponding to the evicted dirty database page can be recorded into the recovery log 110. On a subsequent read of the corresponding out-of-date database page from the database 109, a redo of the modification reflected by the record in the recovery log 110 can be applied, to bring the retrieved database page up-to-date (to be the same as the evicted dirty database page).

A redo is applied by a redo recovery operation, which repeats a change that was made to data of the database. In the foregoing example, the redo of the modification corresponding to the evicted dirty database page refers to repeating the modification on the out-of-date database page. The redo recovery operation can be identified based on the corresponding record in the recovery log 110.

Note that the recovery log 110 can also include information to allow the identification of undo recovery operations. An undo recovery operation refers to undoing a change made to data in the database 109.

As further depicted in FIG. 1, the database system 102 includes a network interface 116. The network interface 116 allows the database system 102 to communicate over a network 118, such as with a backup storage system 104.

The backup storage system 104 includes backup storage media 120, which can be implemented with one or multiple storage devices such as disk-based storage devices, integrated circuit storage devices, and so forth. The backup storage media 120 can store full backup data 122 (where a full backup is a backup of the entire database 109 in the database system 102), incremental backup data 124 (where an incremental backup is a backup of data changed since a previous backup), and other information. Note that a copy of the recovery log 110 may also be provided in the backup storage media 120. Note also that the backup storage device(s) used to store the recovery log may be different from the backup storage device(s) used to store database content. Additionally, the database system 102 and the backup storage system 104 may possibly reside on the same physical system(s), although they are drawn as separate components in the example of FIG. 1.

The backup storage system 104 also includes a backup control module 131 that manages access of data in the backup storage media 120. The backup control module 131 can be implemented as machine-readable instructions executable on one or multiple processors 132 of the backup storage system 104. The backup storage system 104 also includes a network interface 134 that allows the backup storage system 104 to communicate over the network 118.

As further shown in FIG. 1, the database system 102 includes a backup module 128 and a restore module 129. Although depicted as being part of the database system 102 in FIG. 1, it is noted that the backup module 128 and the restore module 129 can be part of a separate system in other implementations, such as part of the backup storage system 104, or part of another system.

The backup module 128 and restore module 129 can be implemented with machine-readable instructions that are executable on the processor(s) 114. The backup module 128 controls the backup of the database 109 to the backup storage system 104. The carrying out of backups (full backups or incremental backups) can be according to a backup policy maintained by the backup module 128. For example, the backup policy can specify how frequently backups are to be carried out, and under what conditions a full backup is to be carried out rather than an incremental backup.

The restore module 129 can carry out restores of data. The restore module 129 can be invoked upon detection of a failure of the storage media 106 or upon detection of data error in any part of the database 109.

Figure 2:
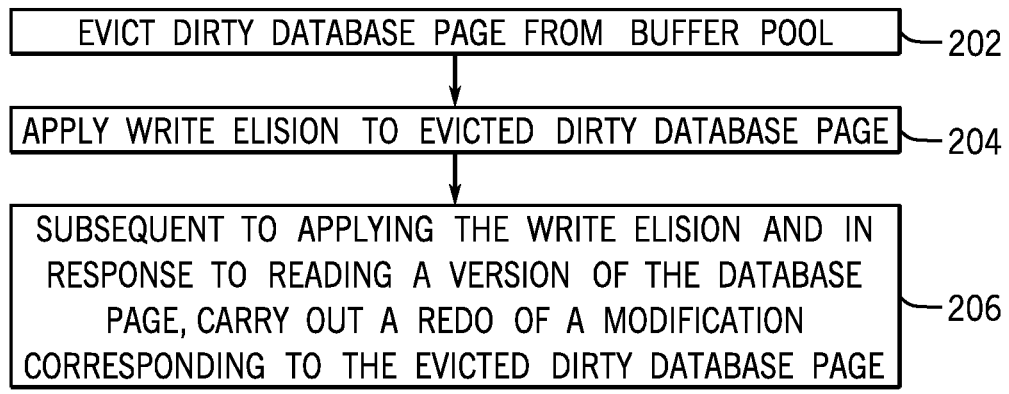
FIG. 2 is a flow diagram of a process according to some implementations.

FIG. 2 is a flow diagram of a process according to some implementations. The process can be executed by the database system 102, for example. A database page is evicted (at 202) from the buffer pool 130, where the evicted database page is a dirty database page that is modified from a corresponding database page 108 in the persistent storage media 106. Eviction of a database page from the buffer pool 130 can be controlled by the database management module 112. Write elision is applied (at 204) by the write elision module 113 to the evicted dirty database page to suppress writing the evicted dirty database page to the persistent storage media 106. As a result, the corresponding database page 108 in the persistent storage media 106 is not updated in response to the evicted dirty database page.

Subsequent to applying the write elision and in response to reading a version of the database page, a redo of a modification of the read database page is carried out (at 206), where the modification corresponds to the modification reflected in the evicted dirty database page. The redo can be based on information in a record from the recovery log 110. The redo can be carried out by the database management module 112, for example, or alternatively, by the write elision module 113, or by another module in the database system 102.

In some implementations, the redo of the modification (at 206) is based on a determination that a database page that is read is out-of-date. In some examples, a version indicator can be associated with each database page, where the version indicator can be used to determine whether a database page is out-of-date. The version indicator can be a sequence number that is updated with each update of the database page since a last backup of the database page. More specifically, a version indicator can be a sequence number that is updated when a log record indicating a change to the database is added to the recovery log 110. The sequence number that indicates the most recent log record reflecting a change to the database page can be referred to as that page's log sequence number (page LSN).

Figure 3:
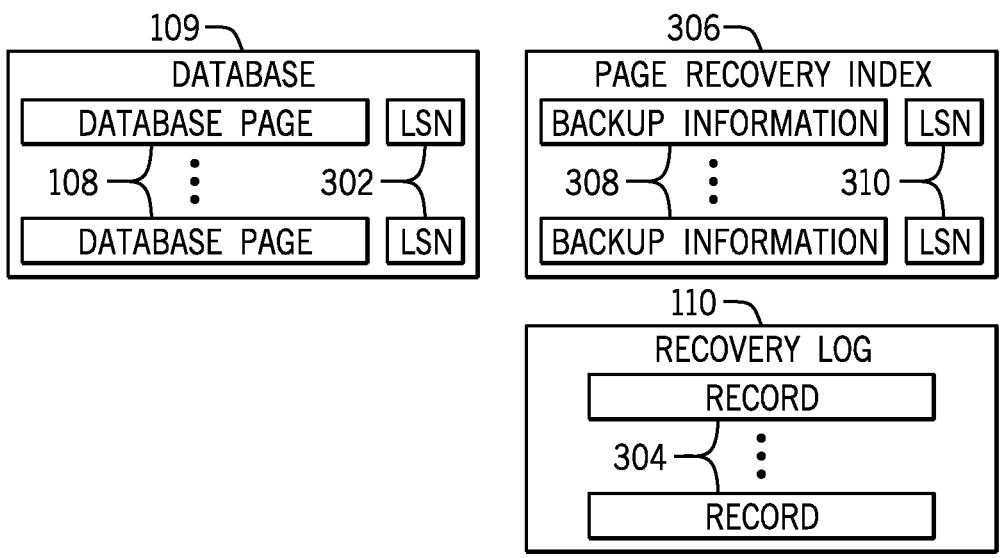
FIG. 3 is a block diagram of an arrangement that includes a database, a page recovery index, and a recovery log, according to some implementations.

FIG. 3 shows the database 109 containing database pages 108, where each database page 108 is associated with a respective page LSN 302. When a database page 108 is read, its associated page LSN 302 can also be retrieved.

FIG. 3 also depicts the recovery log 110, which has log records 304. Each log record 304 contains information relating to a transaction that has modified a database page, where the modifying can include deleting the database page, adding the database page, or updating the database page. The page LSN 302 associated with each database page 108 identifies the log record 304 that was most recently applied to the respective database page 108.

As noted above, the information in a given log record 304 can be used to determine whether a modification of a database page is to be the subject of a redo or undo. The recovery log 110 is normally used in the context of the data recovery after a system crash or other fault. However, in accordance with some implementations, the recovery log 110 can be used to redo a modification that corresponds to a dirty database page that has been evicted from the buffer pool 130 and to which write elision has been applied.

In some examples, the recovery log 110 can be associated with a page recovery index 306. The page recovery index 306 can track the following information, which can be used for recovering from failure or error of a database page: (1) backup information 308, which pertains to the most recent backup copy of a respective database page (e.g., the backup information 308 can identify the most recent backup copy, which can be stored in the backup storage system 104 or in another location); and (2) the respective page LSN 310 (if the respective database page has been updated since the most recent backup) of the most recent log record 304 pertaining to the database page.

The page recovery index 306 includes multiple entries, one for each respective database page. Each entry includes the respective backup information 308 and page LSN 310.

While a given database page is present in the buffer pool 130, the given database page's entry in the page recovery index 306 may fall behind—in other words, the log record 304 mapped to the corresponding entry in the page recovery index 306 may not include information pertaining to a most recent change to the database page that may have been applied in the buffer pool 130. However, when the given database page is not present in the buffer pool 130 (such as after the given database page has been evicted from the buffer pool 130), then the respective entry of the page recovery index has to map to an up-to-date log record 304.

Figure 4:
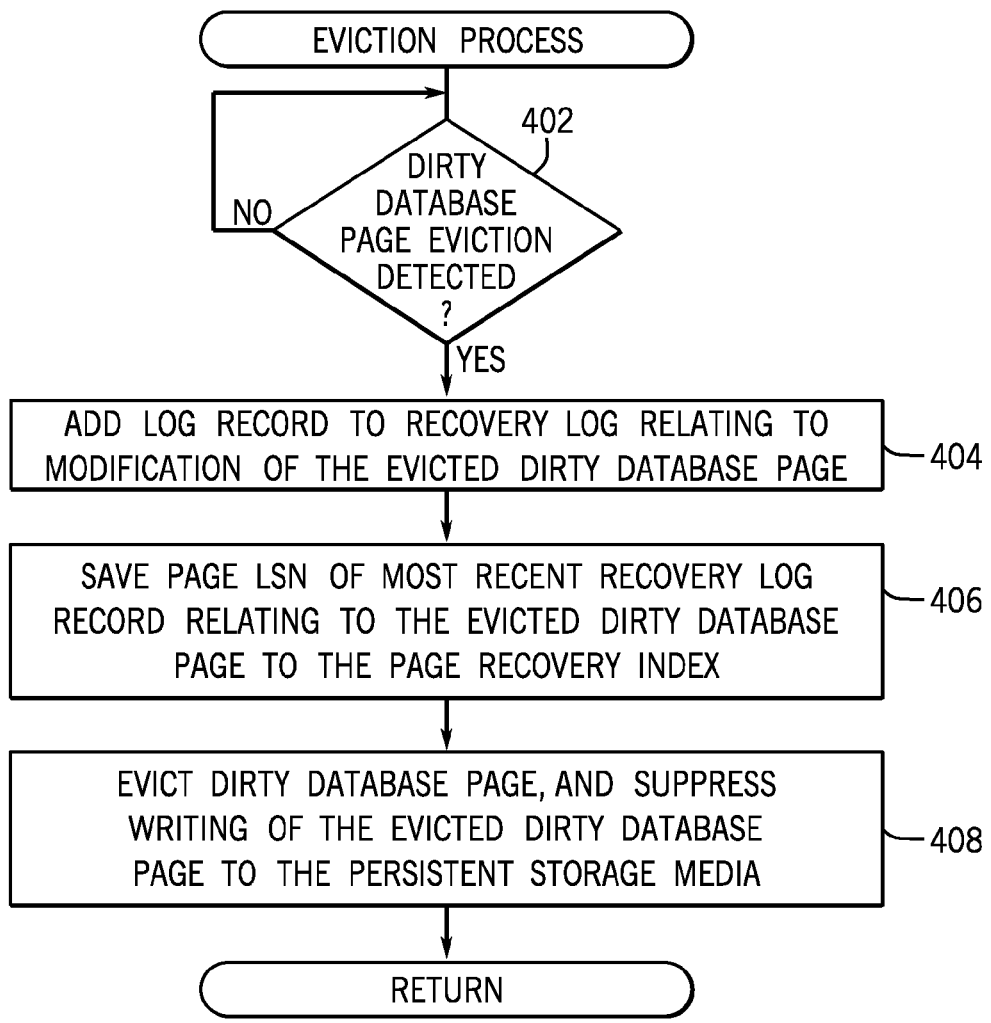
FIG. 4 is a flow diagram of an eviction process according to some implementations.

FIG. 4 is a flow diagram of a process according to some implementations that can be carried out by the write elision module 113. Upon detecting (at 402) eviction, or pending eviction, of a dirty database page from the buffer pool 130, a corresponding log record 304 containing information relating to the modification reflected in the evicted dirty database page is added (at 404) to the recovery log 110. In addition, the page LSN of the most recent recovery log record relating to the evicted dirty database page is saved (at 406) to the respective entry of the page recovery index 306. The dirty database page is evicted (at 408) from the buffer pool 130, and writing of the evicted dirty database page to the persistent storage media 106 is suppressed (write elision is applied).

Figure 5:
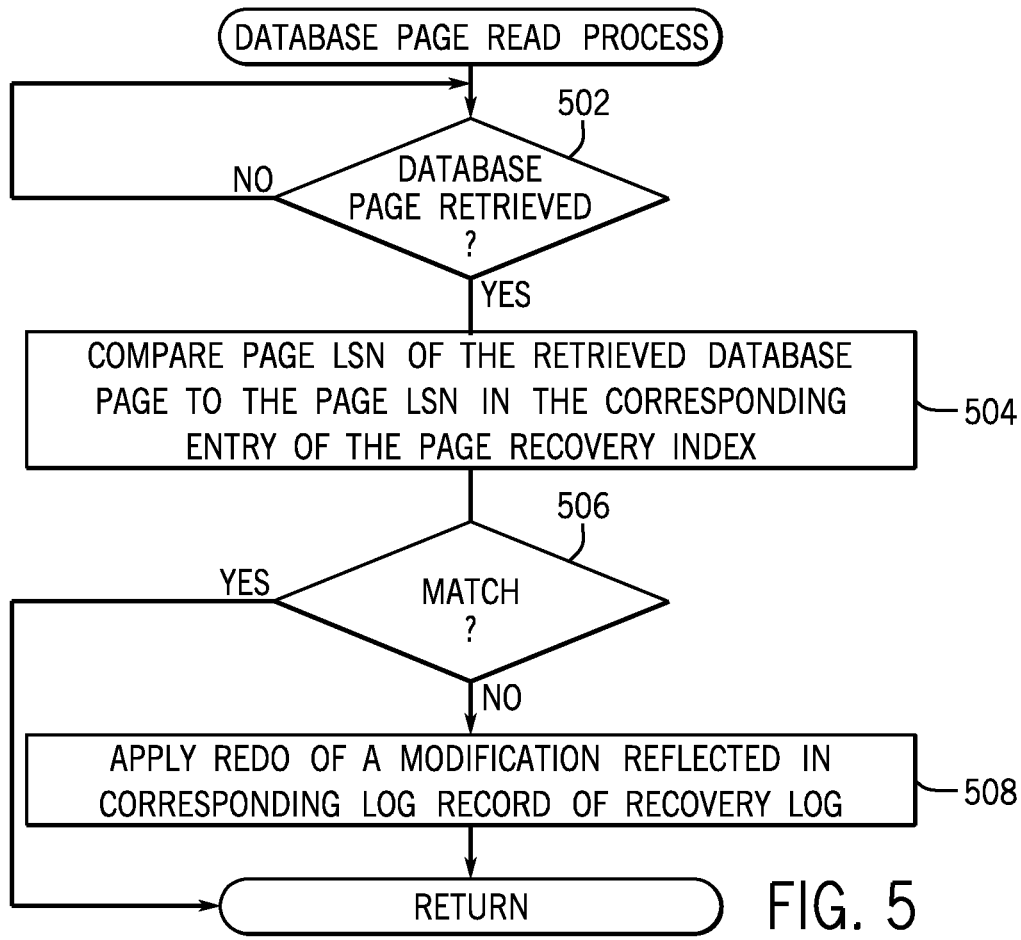
FIG. 5 is a flow diagram of a page read process according to some implementations.

FIG. 5 is a flow diagram of a process according to some implementations that can be executed upon reading a database page that may be out-of-date. The process of FIG. 5 can be carried out by the database management module 112, by the write elision module 113, or by another module in the database system 102.

Upon retrieving (at 502) a database page, such as from the database 109 or from another storage location, into the buffer pool 130, the process of FIG. 5 compares (at 504) the page LSN of the retrieved database page with the page LSN in the corresponding entry of the page recovery index 306. If the page LSNs match, as determined at 506, then that is an indication that the retrieved database page is up-to-date. However, if the page LSNs do not match, then that indicates that the retrieved database page is out-of-date. In response, the process of FIG. 5 applies (at 508) a redo of a modification reflected in the corresponding log record 304 of the recovery log 110, to bring the retrieved database page in the buffer pool 130 up-to-date.

Note that the redo of the modification causes the retrieved database page in the buffer pool 130 to become dirty again, which can be marked in the buffer pool 130 (e.g. by setting a dirty flag to a specified value).

In some implementations, given that the retrieved database page has been reused, the write elision module 113 can decide on the next eviction of this database page that write elision is not to be applied. Instead, on the next eviction, the dirty database page is written to the database 109 to update the corresponding database page 108.

Note that the redo applied at 508 in FIG. 5 may involve accessing more than one log record 304 in the recovery log 110, such as for a modification that includes a sequence or chain of different update operations.

In FIG. 3, the page recovery index 306 is depicted as being a separate structure from the database 109. In other implementations, such as where the database pages 108 are stored as a self-repairing B-tree, the information of the page recovery index 306 may be contained in the self-repairing B-tree.

Figure 6:
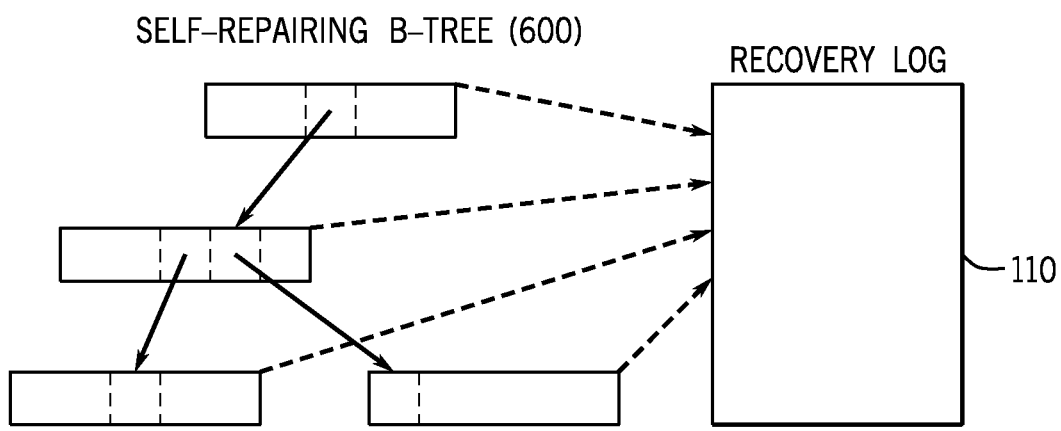
FIG. 6 is a schematic diagram of a self-repairing B-tree according to some implementations.

An example of a self-repairing B-tree 600 is shown in FIG. 6. The self-repairing B-tree has a number of nodes at different hierarchical levels. A self-repairing B-tree is a B-tree index in which a node of the B-tree index contains a pointer to a backup image of the data contained in the node (note that the node of a B-tree index contains the respective database page 108). The pointer can be a pointer to the most recent backup image for the data of the node. Each node can also contain a pointer (dashed arrows in FIG. 6) into the recovery log 110, and more specifically, a pointer to the most recent log record pertaining to the page represented by the node. This pointer is referred to as a page LSN. The page LSN identifies the recovery log record that was most recently applied to the respective page.

Additionally, each of the nodes (other than leaf nodes) of the self-repairing B-tree 600 has a child pointer. In other words, a parent node has a child pointer (parent-to-child pointer). The parent-to-child pointer is the expected Page LSN in the child node. If the child node is up-to-date, the child node's Page LSN is equal to or higher than the expected Page LSN.

A root-to-leaf B-tree traversal (carried out as part of one or multiple transactions) can determine, based on the Page LSNs of the nodes, whether a B-tree node is up-to-date, and can invoke an individual page redo recovery operation if the B-tree node is not up-to-date. If the expected page LSN is newer than the actual page LSN, then a single-page recovery (redo operation) is to be applied.

In some implementations, write elision can be applied for all types of database pages that may be evicted from the buffer pool 130. A first type of database page can store user data. Another type of database page can store system metadata, such as metadata in a database catalog, metadata relating to free storage space management, metadata in the page recovery index, and other metadata.

In alternative implementations, write elision is applied to a subset of the types of database pages that may be evicted from the buffer pool 130. For example, write elision can be applied to user data pages, but not to metadata pages. Dirty metadata pages evicted from the buffer pool 130 can be written back to the persistent storage media 106 to update the corresponding database pages in the persistent storage media 106.

Alternatively, write elision can be applied to evicted dirty metadata pages, but prior to resumption of transactions in the database system 102 that may have to use the dirty metadata pages that were previously evicted, the dirty metadata pages may be restored back into the buffer pool 130 by applying corresponding redo operations based on respective log records of the recovery log 110.

According to other implementations, transactions can be resumed prior to recovery of the evicted dirty metadata pages to write elision has been applied, but while the transactions are ongoing, single-page redo can be applied for those metadata pages without waiting for requests for those pages.

For more efficient single-page recovery, in particular if main memory of the database system 102 is unable to hold the entire recovery log 110, a log backup technique can partition log records into multiple partitions, such as by device. As another example, undo information (information for undoing data changes) or other information irrelevant to data recovery can be omitted from log records stored in main memory. Also, log records pertaining to the same database page can be aggregated, where aggregation may rely on sorting or hashing, and aggregation may compute the net change of a sequence of log records. The net change of a sequence of log records refers to a sequence of changes that may operate on the same database page. For example, a first change can cause data in the database page to be modified from a first value to a second value, while a second change can cause data in the database page to be modified from the second value back to the first value. The net change in this example is that the data remains at the first value.

Some buffer pool management mechanisms may include processes for asynchronously identifying dirty database pages in the buffer pool for writing back to the database. If write elision according to some implementations is applied, then such processes for asynchronously identifying and writing dirty database pages can be omitted.

Various modules described above, such as modules 112, 113, 128, 129, and 131, can be implemented as machine-readable instructions that are executable on a processor or processors (e.g. 114 or 132 in FIG. 1). A processor can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   evicting a first data portion of a first type from a buffer in a system comprising a processor, wherein the evicted first data portion is modified from a corresponding data portion of the first type in a persistent storage;
   applying, by the system, write elision to suppress writing the evicted first data portion to the persistent storage;
   in response to the evicting of the first data portion from the buffer, writing, by the system, a record corresponding to the evicted first data portion to a recovery log;
   subsequent to applying the write elision and in response to reading a version of the first data portion, executing, by the system using the record in the recovery log, a redo of a modification of the read first data portion;
   evicting, by the system, a second data portion of a second type from the buffer, wherein the evicted second data portion is modified from a corresponding data portion of the second type in the persistent storage;
   applying, by the system, write elision to the evicted second data portion; and
   subsequent to applying the write elision to the evicted second data portion, executing, by the system, a redo of a modification corresponding to the evicted second data portion without having to first read the data portion of the second type from the persistent storage.

2. The method of claim 1, further comprising:
   comparing a version indicator of the read first data portion with a version indicator associated with the record of the recovery log, wherein the redo of the modification is executed in response to the comparing indicating a mismatch between the version indicators.

3. The method of claim 2, wherein the version indicator associated with the record of the recovery log is part of a recovery index that maintains information regarding a most recent backup copy of the first data portion, the method further comprising:
   in response to a failure of the persistent storage or an error in data stored in the persistent storage, using the recovery index comprising the most recent backup copy of the first data portion to restore data of the persistent storage from a backup storage system that stores a backup copy of data in the persistent storage.

4. The method of claim 3, further comprising:
in response to detecting the evicting of the first data portion, writing the version indicator corresponding to the evicted first data portion to the recovery index.

5. The method of claim 1, wherein executing the redo of the modification causes the read first data portion to become up-to-date.

6. The method of claim 1, wherein applying the write elision results in a reduction of an amount of data in a differential backup of data in the persistent storage to a backup storage system.

7. The method of claim 1, further comprising storing the first data portion in a node of a B-tree having a plurality of nodes that represent respective data portions.

8. The method of claim 7, wherein at least some nodes of the B-tree include parent-to-child pointers, the method further comprising:
using a respective one of the parent-to-child pointers to determine whether the read first data portion is out-of-date.

9. A system comprising:
a persistent storage to store database pages;
a buffer; and
at least one processor to:
evict a first dirty database page of a first type from the buffer, wherein the evicted first dirty database page is modified from a particular database page of the first type in the persistent storage;
apply, under control of a write elision module executed on the at least one processor, write elision to suppress writing the evicted first dirty database page to the persistent storage, such that the particular database page fails to reflect a modification of data in the evicted first dirty database page;
in response to the evicting of the first dirty database page from the buffer, write, under control of the write elision module, a record corresponding to the evicted first dirty database page to a recovery log; and
subsequent to applying the write elision and in response to reading the particular database page from the persistent storage, redo the modification with respect to the particular database page using the recovery log;
evict a second dirty database page of a second type from the buffer, wherein the evicted second dirty database page is modified from a corresponding database page of the second type in the persistent storage;
apply write elision to the evicted second dirty database page; and
subsequent to applying the write elision to the evicted second dirty database page, execute a redo of a modification corresponding to the evicted second dirty database page without having to first read the database page of the second type from the persistent storage.

10. The system of claim 9, further comprising:
a backup module to carry out an incremental backup of the database pages in the persistent storage, wherein the incremental backup does not back up the particular database page.

11. The system of claim 9, wherein the persistent storage is to store a self-repairing B-tree having nodes storing the respective database pages.

12. The system of claim 9, wherein the at least one processor is to redo the modification with respect to the particular database page in response to determining that the particular database page is out-of-date.

13. The system of claim 12, further comprising a page recovery index to store a page sequence number associated with the evicted dirty database page, wherein determining that the particular database page is out-of-date uses the page sequence number in the page recovery index.

14. The system of claim 13, wherein the recovery log has log records corresponding to changes to database pages,
wherein the page recovery index has a plurality of entries, each of at least some of the plurality of entries including a respective page sequence number that identifies a corresponding log record in the recovery log that was most recently applied to the respective database page.

15. An article comprising at least one non-transitory machine-readable storage medium storing instructions that upon execution cause a system to:
evict a first data portion of a first type from a buffer, wherein the evicted first data portion is modified from a corresponding data portion in a persistent storage;
apply, by a write elision module, write elision to suppress writing the evicted first data portion to the persistent storage; and
in response to the evicting of the first data portion, add, by the write elision module, a record relating to a modification reflected in the evicted first data portion into a recovery log;
subsequent to applying the write elision and in response to reading a version of the first data portion, execute a redo of a modification of the read first data portion using the record from the recovery log;
evict a second data portion of a second type from the buffer, wherein the evicted second data portion of the second type is modified with respect to a respective data portion of the type in the persistent storage;
apply write elision to the evicted second data portion; and
subsequent to applying the write elision to the evicted second data portion, execute a redo of a modification corresponding to the evicted second data portion without having to first read the data portion of the second type from the persistent storage.

16. The article of claim 15, wherein the instructions upon execution cause the system to further:
execute the redo in response to determining that the read first data portion is out-of-date due to the write elision to suppress writing the evicted first data portion to the persistent storage.

* * * * *